(12) United States Patent
Wilson, III et al.

(10) Patent No.: US 7,884,490 B1
(45) Date of Patent: Feb. 8, 2011

(54) RESONATING BLADE FOR ELECTRIC POWER GENERATION

(75) Inventors: Jack W Wilson, III, Palm Beach Gardens, FL (US); Jack W Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 12/629,096

(22) Filed: Dec. 2, 2009

Related U.S. Application Data

(63) Continuation of application No. 12/119,549, filed on May 13, 2008, now Pat. No. 7,633,175.

(51) Int. Cl.
 F03B 13/12 (2006.01)
 F03B 13/10 (2006.01)
 H02P 9/04 (2006.01)
(52) U.S. Cl. .......................... 290/43; 290/54
(58) Field of Classification Search .................. 290/43, 290/54, 1 R; 60/398, 325, 671; 415/85, 415/7; 166/65.1; 310/36, 37, 38, 25, 15, 310/23, 339; 175/104; 416/7, 85
See application file for complete search history.

(56) References Cited

U.S. PATENT DOCUMENTS

| | | | | |
|---|---|---|---|---|
| 3,500,078 A | * | 3/1970 | Buser et al. ................... 310/13 |
| 4,549,154 A | * | 10/1985 | Thoma ......................... 335/87 |
| 4,790,723 A | * | 12/1988 | Wilson et al. ........... 416/220 R |
| 6,827,556 B2 | * | 12/2004 | Simon ..................... 416/241 R |
| 7,208,845 B2 | * | 4/2007 | Masters et al. .............. 290/1 R |
| 7,491,030 B1 | * | 2/2009 | Pinera et al. ................. 415/161 |
| 7,633,175 B1 | * | 12/2009 | Wilson et al. ................. 290/43 |
| 2008/0088819 A1 | * | 4/2008 | Metzger et al. ............... 356/28 |

FOREIGN PATENT DOCUMENTS

WO   WO 2007/071975 A1 *  6/2007

* cited by examiner

*Primary Examiner*—Julio Cesar Gonzalez
(74) *Attorney, Agent, or Firm*—John Ryznic

(57) ABSTRACT

An apparatus for generating electric current from a vibrating blade exposed to a fluid flow. in one embodiment, a plurality of blades are secured within a tail cone of a steam turbine and each blade includes a magnet and a coil associated with the magnet to produce electric current in the coil when the magnet moves across the coil. Each blade is designed to have a natural frequency so that the blade will resonate under the influence of the exhaust flow from the turbine in the tail cone. Abutment members are mounted on the blade or the fixed support to limit the range of motion of the vibrating blade so that it does not exceed the fatigue limit. The blades are made from a low damping material such as titanium so that a low frequency is produced.

11 Claims, 2 Drawing Sheets

RESONATING BLADE FOR ELECTRIC POWER GENERATION

CROSS-REFERENCE TO RELATED APPLICATIONS

This application is a Continuation of U.S. Regular patent application Ser. No. 12/119,549 filed on May 13, 2008 which is issued as U.S. Pat. No. 7,633,175 issued on Dec. 15, 2009.

FEDERAL RESEARCH STATEMENT

None.

BACKGROUND OF THE INVENTION

1. Field of the Invention

The present invention relates generally to electric power production, and more specifically to a steam turbine with a resonating blade for electric power production.

2. Description of the Related Art including information disclosed under 37 CFR 1.97 and 1.98

A steam turbine is used in the electric power production to convert some of the energy in a high pressure and high temperature steam into electrical energy in which the steam is passed through a multiple staged turbine that drives an electric generator. Other engines can also be used to drive a generator such as an industrial gas turbine engine or an internal combustion engine such as a diesel engine. These engines can be relatively high efficient converters of chemical energy into mechanical energy—such as the steam turbine and the IGT—or relatively lower efficient converters such as in the internal combustion engines (ICE). One reason the ICE engine is so low in efficiency compared to the other two mentioned above is that the exhaust gas from the engine is still very high in temperature and thus high in potential energy. The exhaust gas from a steam turbine might be around 400 F because of the more highly efficient turbine that decreases the temperature of the gas flow. Still, even in the steam turbine, the exhaust gas discharged from the power generating system has some potential energy that is wasted by discharging the exhaust into the atmosphere.

The prior art reference U.S. Pat. No. 6,876,094 B2 issued to Jacobsen on Apr. 5, 2005 and entitled RESONANT ELECTRICAL GENERATION SYSTEM discloses a cantilever beam that resonates by application of energy pulses from a pulsatile linear combustor that provides fluid pressure against a piston that is directly connected to the cantilever beam. The pulsating combustor pushes on the piston that then pushes on the cantilever beam to resonate a wire coil connected on the end of the beam, where the moving coil passes back and forth between a permanent magnetic to produce electrical energy.

BRIEF SUMMARY OF THE INVENTION

It is an object of the present invention to generate electrical energy from the waste flow in a fluid passing through a casing or channel.

It is another object of the present invention to generate electrical energy from the exhaust gas typically discharged from a steam turbine.

It is another object of the present invention to make use of a turbine blade's natural frequency to produce electrical energy from a resonating blade.

It is another object of the present invention to provide for a blade construction in which the blade is designed to be right at the first mode of vibration of the natural frequency.

It is another object of the present invention to provide for a blade used for resonating with bumpers to prevent the resonating blade from exceeding its maximum stress limit.

DETAILED DESCRIPTION OF THE INVENTION

Figure 1:
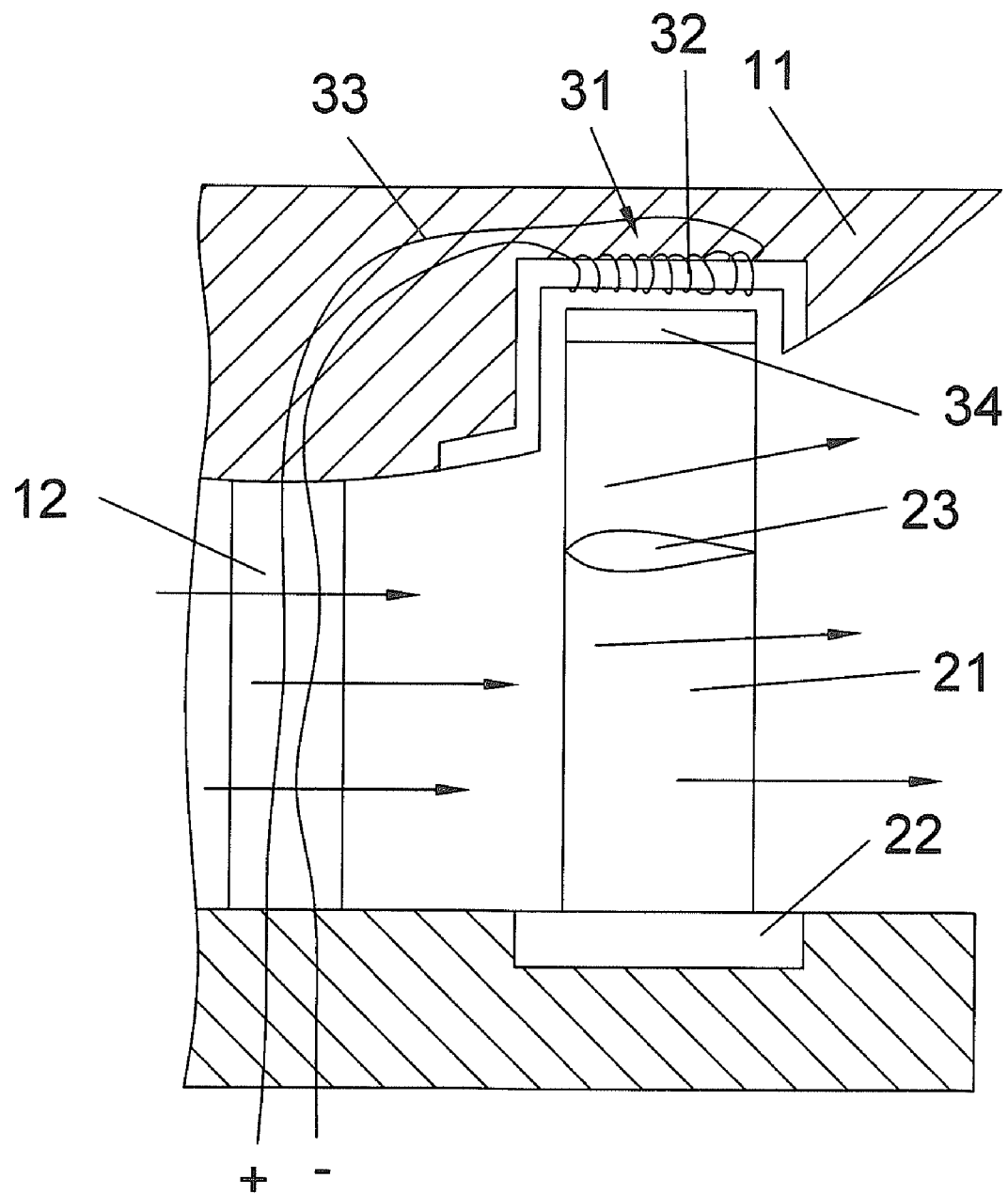
FIG. 1 shows a resonating blade of the present invention in the tail cone of a steam turbine.
Figure 2:
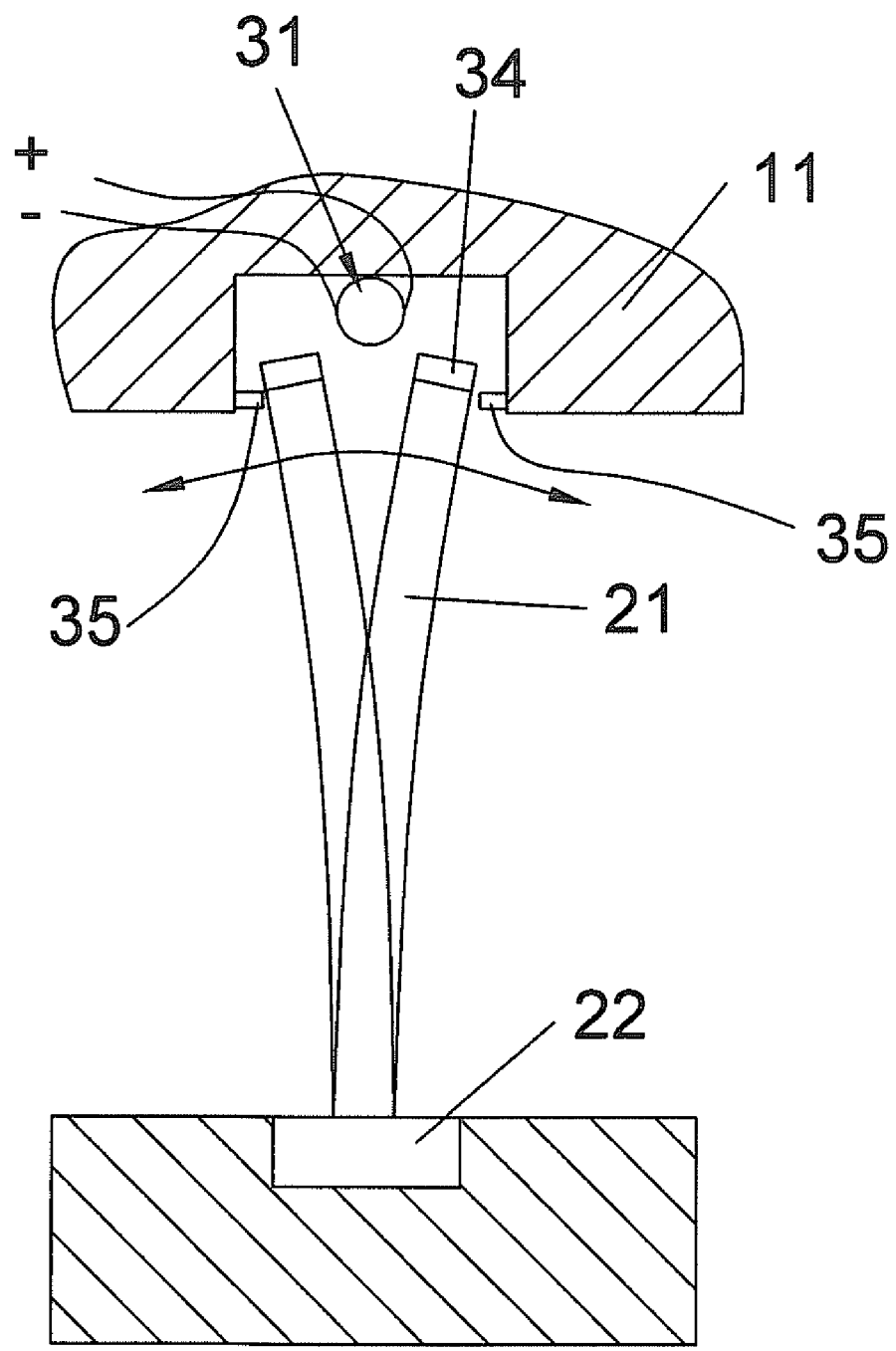
FIG. 2 shows a rear view of the resonating blade of FIG. 1.

One embodiment of the present invention is shown in FIGS. 1 and 2 in which the resonating blade is used in a steam turbine tail cone to produce the electrical energy. A steam turbine includes a tail cone 11 that has a divergent nozzle shape in order to discharge the exhaust from the turbine in the most efficient manner. One or more struts extend within the tail cone such that the struts support the tail cone and are exposed to the steam exhaust. A blade 21 is secured by a flange 22 to a portion of the tail cone 11 to secure the blade while allowing it to resonate. The blade has a typical airfoil cross sectional shape 23 along the airfoil portion of the blade. The blade or blades are mounted in the tail cone of the steam turbine where the temperature probes are typically found.

The blade is designed to have a maximum stress at the lower portion near to the fatigue limit of the blade in order to maximize the resonating capability of the blade. A very stiff blade will require a higher driving force to produce resonating motion of the blade. The blade is also preferably made from a material that has high Q value so that the blade will have low damping. Titanium is one material in which the blade can be made from because titanium will produce a blade with a low frequency. The Q for a blade can be from around 30 up to around 500 so that a lot of energy can be stored in the resonating blade which can then be converted into electrical power. Since the blade is designed close to the fracture limit due to the maximum stress being developed from resonating, the blade must include some device to limit the amount of flexing from the driving force so that the blade does not fracture. The closest to the maximum stress level that the blade is designed at provides for the most flexible blade to produce resonant vibrations. As described above, the blade can be made stiffer in order to move about the maximum stress limit that is developed, but the velocity of the driving fluid would need to be higher to produce resonant vibration of that particular blade design. The blade is designed to have a natural frequency at the air velocity of the steam turbine in the tail cone.

An alternator assembly 31 is mounted in the tail cone 11 and includes a coil wire 32 in the stationary portion of the tail cone with a wire 33 extending from the coil to carry the electrical energy produced. The blade 21 includes a tip with a permanent magnet 34 secured onto the tip. The magnet 34 in the first embodiment is a superconducting magnet in order to produce the highest amount of electric current. In another embodiment, it could be a non-permanent magnet in which the magnetic effect can be controlled. A pair of abutments 35 is secured to the blade near the tip and engages with the surfaces of the alternator assembly to limit the range of motion of the blade so that the maximum stress is not surpassed at the blade lower portion where blade could break. The abutments 35 can be formed on the blade or on the inside surfaces of the alternator assembly 31. FIG. 2 shows a rear view of the blade within the alternator assembly formed in the tail cone 11. In the tail cone of a steam turbine, 8 blades are used and extend around a central support to form an annular flow path for the fluid to pass across the 8 blades. Each blade includes a magnet and a coil associated with the magnet to convert the vibrations of the blade into electrical power.

The operation of the resonating blade within the exhaust of the steam turbine is described below. The exhaust from the steam turbine passes through the tail cone and has a certain velocity. The resonating blade is design to have a first mode of vibration at this exhaust velocity so that the blade 21 will vibrate at the resonant frequency. The blade 21 is secured to the tail cone structure or any other convenient structure within the steam turbine so that the blade will vibrate within the exhaust flow. As the blade vibrates, the magnet secured to the tip of the blade will oscillate is close proximity to the coil 32 such that an electric current is developed within the coil. The electric current generated within the coil 32 will pass down through the wire or wires 33 as AC current. DC current could also be produced if both directions of blade vibration are not used to produce electric current. Thus, the energy still contained within the steam turbine exhaust gas flow that passes through the tail cone is used to produce resonant vibration of the blade 21 to generate electric current.

In the steam turbine example of the use of the present invention, one or more blades can be arranged in the tail cone to extract energy from the discharging exhaust of the steam turbine. The size and shape of the blades would depend on the potential energy contained within the exhaust fluid used to drive the blades at the resonant frequency. In a gas turbine engine, the resonating blade could also be used to extract electrical energy from the exhaust gas flow passing out from the turbine. An internal combustion engine produces relatively very low volume of exhaust gas from the engine to make use of the resonating blade to produce electrical power compared to the steam or gas turbine exhaust flow.

The blade is designed to have a natural frequency equal to the velocity of the fluid exhausted from the apparatus in which the additional electrical power is to be generated. Since the movement of the magnet through the coils will produce a resistance due to the electrical power being created, the vibrating blade will have a resistance to its movement that will need to be overcome in order that the blade will continue to resonate. For this reason, the blade could be designed with a natural frequency below the fluid speed that causes the vibration. A blade will vibrate at the natural frequency with a certain amount of energy contained within the vibration. As long as the energy that is being created in the electrical current does not cause the vibrating blade to lose enough energy to prevent resonating at the natural frequency, then the blade will continue to produce electric power in the specific fluid flow at that speed.

Another embodiment of the invention can include a means to regulate the current flow within the coil so that the damping of the vibrating blade can be controlled. A sensor to detect the amount of vibration occurring in the blade could be used to regulate the current flow and therefore provide a certain amount of damping to the blade in order to prevent the maximum stress from exceeding the fatigue limit by a certain amount that would cause the blade to break.

The invention claimed is:

1. An electric power producing apparatus comprising:
   a blade having a natural frequency designed for a specific fluid flow speed;
   the blade being secured to a support so that the blade can vibrate in a fluid flow across the blade;
   the blade having a leading edge and a trailing edge with the fluid flowing over both sides of the blade from the leading edge to the trailing edge;
   the blade extending from the support to a blade tip in a spanwise direction of the blade that is perpendicular to the fluid flow direction;
   one of a magnetic and a coil secured to the blade tip;
   the other of the magnet and the coil secured to a fixed support near the magnet such that movement of the magnet will produce an electric current within the coil; and,
   fluid flow supply means to pass a fluid across the blade at around a predetermined speed to cause the blade to resonate at the natural frequency and produce electric current in the coil.

2. The electric power producing apparatus of claim 1, and further comprising:
   the magnet is a superconducting magnet.

3. The electric power producing apparatus of claim 1, and further comprising:
   the magnet is secured to the blade tip.

4. The electric power producing apparatus of claim 1, and further comprising:
   the blade is designed to have a maximum stress just under the fatigue strength of the blade when the blade is resonating.

5. The electric power producing apparatus of claim 1, and further comprising:
   the source of the fluid is a steam turbine; and,
   the blade is secured within a tail cone of the steam turbine.

6. The electric power producing apparatus of claim 5, and further comprising:
   the blade is secured within the tail cone near where a temperature probe would typically be located.

7. The electric power producing apparatus of claim 1, and further comprising:
   the blade is made from a material that has low damping.

8. The electric power producing apparatus of claim 7, and further comprising:
   the blade is made substantially from titanium.

9. The electric power producing apparatus of claim 1, and further comprising:
   means to limit the range of motion of the vibrating blade so that the maximum stress does not exceed the fatigue limit of the blade during resonating.

10. The electric power producing apparatus of claim 9, and further comprising:
    the means to limit the range of motion are two abutments on the blade near the tip or on the fixed support near the tip.

11. The electric power producing apparatus of claim 5, and further comprising:
    a plurality of blades arranged around the tail cone, each blade being designed with about the same natural frequency; and,
    each blade having a magnet and a coil operatively associated with the magnet to produce electric current when the respective blade vibrates near the respective coil.

* * * * *